United States Patent [19]

Tröster

[11] Patent Number: 5,066,076
[45] Date of Patent: Nov. 19, 1991

[54] APPARATUS FOR FIXING THE HYDRAULIC UNIT OF AN ABS AND/OR AN ASR IN THE MOTOR SPACE OF A STREET VEHICLE

[75] Inventor: Harry Tröster, Tamm, Fed. Rep. of Germany

[73] Assignee: Mercedes-Benz AG, Fed. Rep. of Germany

[21] Appl. No.: 573,692

[22] Filed: Aug. 28, 1990

[30] Foreign Application Priority Data

Dec. 15, 1989 [DE] Fed. Rep. of Germany ....... 3941401

[51] Int. Cl.$^5$ .......................... B60T 8/00; B60T 17/00; B62D 27/06; B60K 28/16
[52] U.S. Cl. ..................................... 303/113; 188/371; 180/274; 248/548; 248/900
[58] Field of Search ..................... 303/113, 91, 119, 1; 188/181 R, 181 A, 205 R, 382, 371-377; 248/548, 900; 180/274, 281; 267/136, 141, 152

[56] References Cited

U.S. PATENT DOCUMENTS 4,955,673  9/1990  Fukuda ............................... 303/113

Primary Examiner—Douglas C. Butler
Attorney, Agent, or Firm—Evenson, Wands, Edwards, Lenahan & McKeown

[57] ABSTRACT

In the case of an apparatus for the fixing of the hydraulic unit of an ABS and/or an ASR in the motor space of a street vehicle, the hydraulic unit is axially supported between one forward and two rearward rubber buffers which are arranged on a console which, in turn, is fixed on the vehicle body. In order to achieve, during an impact of the vehicle on an obstacle, a detaching of the anchoring of the hydraulic unit from the console or the body of the vehicle, at least one holding element of the forward rubber buffer is implemented with a defined low holding force which, starting from a minimum deceleration of the vehicle, results in a deflection of the holding element and thus in a release of the hydraulic unit. This holding element may be constructed to be pivotable or bendable. In a special development, a rivet which, in the case of a crash, acts as a desired breaking point, is provided for the fixing of the console on the vehicle body.

6 Claims, 2 Drawing Sheets

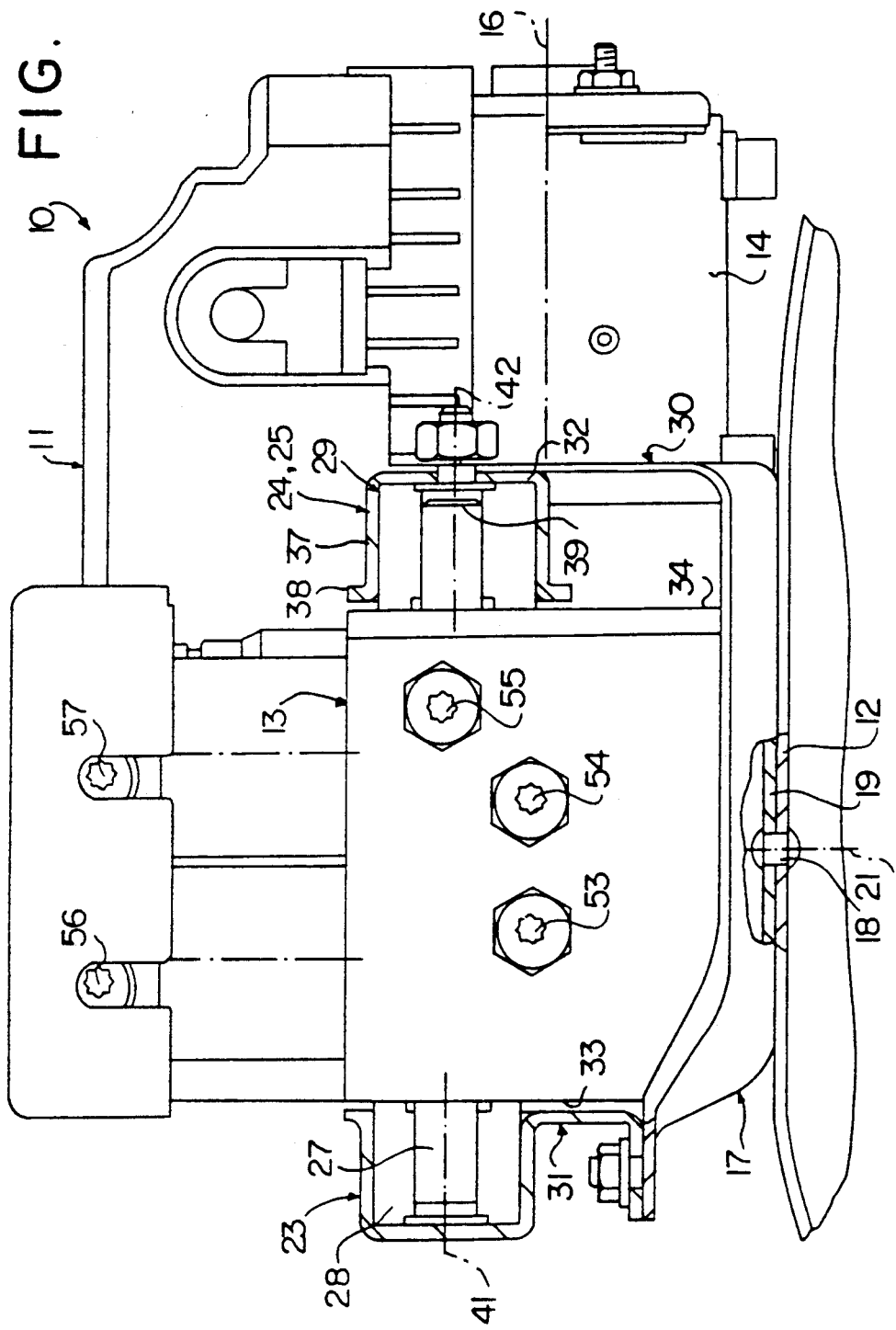

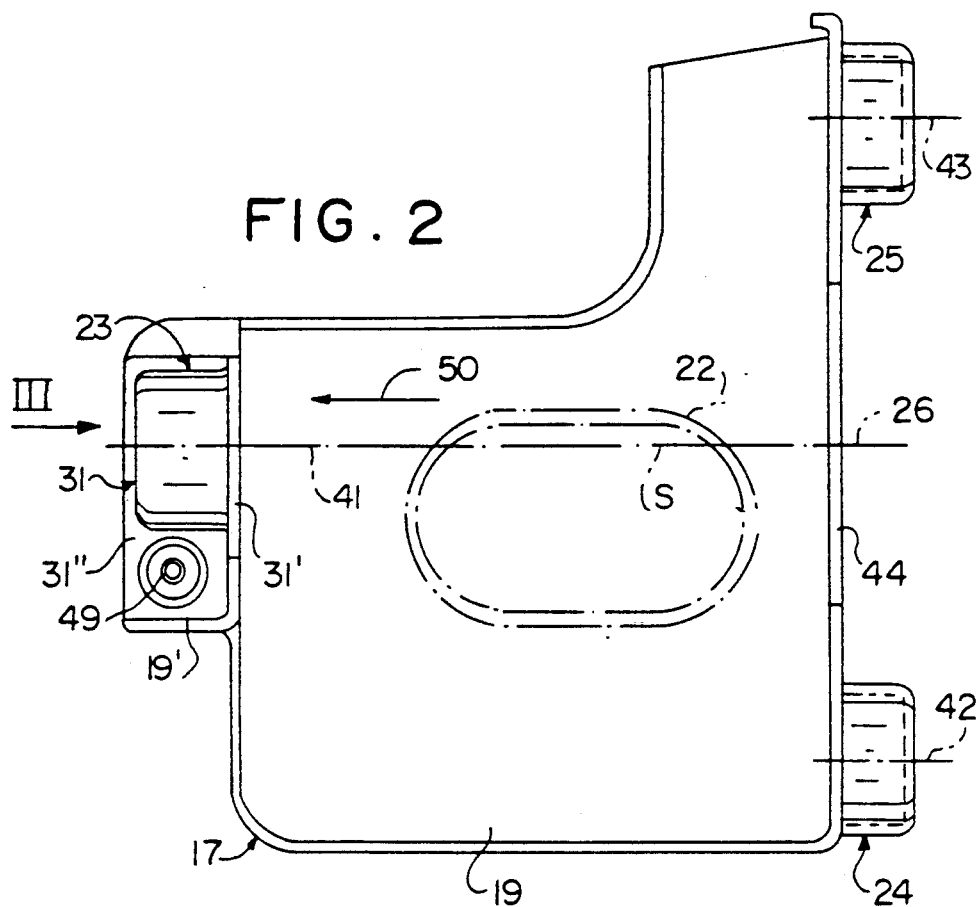
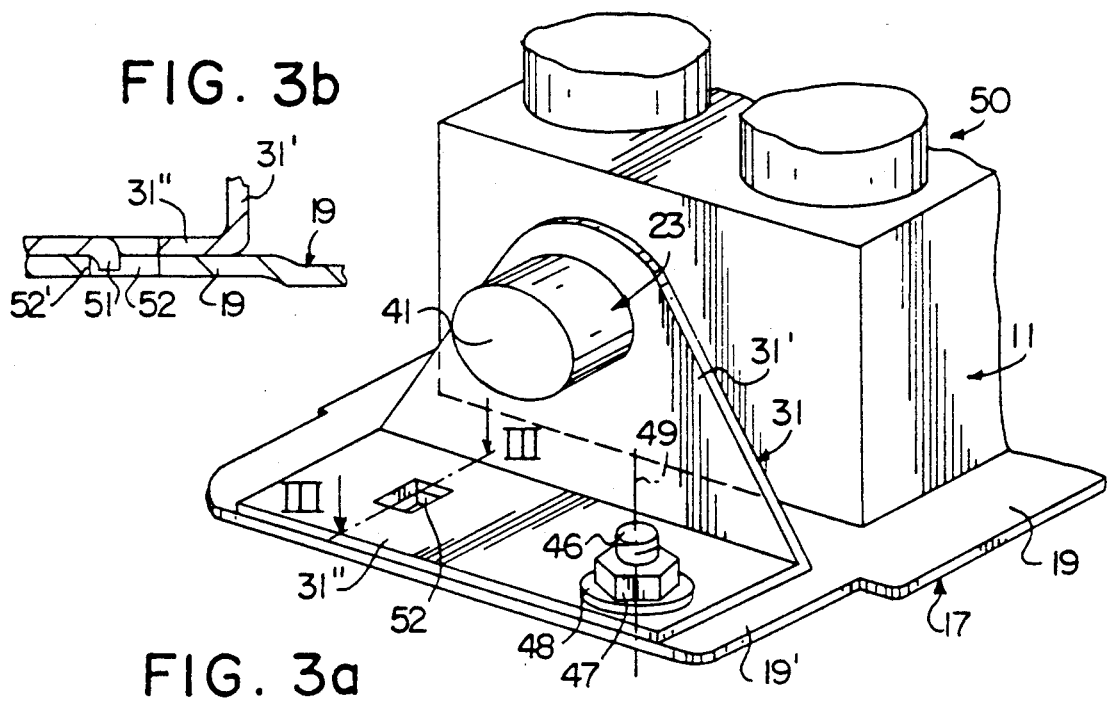

APPARATUS FOR FIXING THE HYDRAULIC UNIT OF AN ABS AND/OR AN ASR IN THE MOTOR SPACE OF A STREET VEHICLE

The invention relates to an apparatus for fixing the hydraulic unit of an ABS (antilock system) and/or an ASR (wheel slip control system) in the motor space of a street vehicle on its vehicle body, this hydraulic unit, viewed in the longitudinal direction of the vehicle, being held between upward-projecting forward and rearward legs of a console which can be fixed on the vehicle body.

During the series assembly of the ABS customary today—the corresponding situation applies to an ASR implemented in combination with an ABS—, the console provided as the support for the hydraulic unit, which normally comprises a block of brake pressure control valves, a return pump and its driving motor as well as possibly a pressure accumulator, is welded onto the vehicle body, in a preferred arrangement, to the top side of one of the wheel houses of the front wheels. The console, which consists of body sheet-metal, comprises a central supporting leg which, with respect to the basic shape, is flat-plate-shaped, in the installed position is arranged horizontally and from which—viewed in the longitudinal direction of the vehicle—a forward and a rearward supporting leg project upwards on which cup-sleeve-shaped buffers are fastened, the journals of the hydraulic unit projecting into it which are parallel to the axis. The hydraulic unit is disposed in this a manner between the two supporting legs of the console—while insulating vibrations. This bearing arrangement takes place in the manner of a three-point bearing, one central rubber buffer being arranged on the forward supporting leg, and two rubber buffers being arranged on the rearward supporting leg, which are mounted on one supporting tab respectively of the rearward supporting leg and projecting upward on both sides of the driving motor of the return pump of the hydraulic unit arranged here.

In practice, a hydraulic unit of this type, on one side, by way of relatively "long" tube-shaped master brake lines, is connected to the pressure outputs of the brake booster of the brake system which are assigned individually to the brake circuits of the vehicle, and, on the other side, to also tube-shaped "fixedly laid" sections of the brake line branches which continue on to the individual wheel brakes and finally by way of flexible brake hoses are connected with the wheel brake cylinders of the individual wheel brakes.

This type of an arrangement and fixing of the hydraulic unit of an ABS and/or an ASR has considerable disadvantages with respect to safety:

In the case of an accident, in which a considerable deformation takes place of the vehicle front end which houses the engine and the hydraulic unit, it is almost inevitable that the tube-shaped brake line sections—which are designed as short as possible—or sections of brake line branches are torn off the hydraulic unit—which is fixedly connected with the vehicle body —, with the result that the brake fluid may be ignited when it comes in contact with hot engine parts, and the vehicle may therefore start to burn. This risk of fire which exists at least in the case of collision situations will also exist when the hydraulic unit is arranged such that, in the case of a deformation of the vehicle front end, for example, caused by a backing-up truck, they damage live electrical lines and may therefore trigger electrical short-circuits connected with sparking, whereby brake fluid leaking out of the hydraulic unit may also be ignited relatively easily.

It is therefore an object of the invention to improve an arrangement of the initially mentioned type for the fixing of the hydraulic unit of an ABS and/or of an ASR such that the above-mentioned risks are largely eliminated.

This and other objects are achieved by the present invention which provides an apparatus for fixing a hydraulic unit of at least one of an antilock system (ABS) and a wheel slip control system (ASR) in a motor space of a street vehicle on its vehicle body. The hydraulic unit, viewed in the longitudinal direction of the vehicle, is held between at least one forward and two rearward upwardly projecting legs of a console which is fixed on the vehicle body. At least one holding element is provided on the console and causes the fixing of the hydraulic unit against axial displacements and has a defined low holding force which, starting from a specified minimum deceleration of the vehicle, is no longer sufficient for holding the hydraulic unit fixed to the vehicle body. This minimum deceleration is clearly higher than the vehicle decelerations occurring during the driving operation, but is lower than the longitudinal decelerations of the vehicle occurring in the case of an accident-caused impact of the vehicle on an obstacle which may lead to a deformation of the vehicle in the area of the apparatus itself.

As a result of the accordingly provided limiting of the holding force of a holding or supporting element causing the axial fixing of the hydraulic unit, the hydraulic unit, starting from a certain minimum deceleration of the vehicle, may detach itself from its anchoring at the vehicle body and may therefore, in an almost unhindered manner, follow excursions which the tube-shaped master brake lines connected to the hydraulic unit experience in the case of a deformation of the vehicle front end (case of a crash), so that these master brake lines at least cannot be torn off and a leaking of brake fluid into the engine space of the motor vehicle is therefore practically impossible. Although it has detached itself from its anchoring, the hydraulic unit remains, as it were, "flexibly suspended" at the brake lines. A latent source of danger which exists otherwise in the case of a "crash" involving a vehicle fire is therefore largely avoided.

Certain embodiments of the present invention provide alternative technically simple measures which may also be implemented in any arbitrary combination and by means of which the limiting of the holding or supporting force can be achieved which is utilized according to the invention.

Additional details and characteristics of the invention are found in the following description of special embodiments by means of the drawing.

FIG. 1 is a schematically simplified lateral view of a special embodiment of an apparatus according to the invention for fixing the hydraulic unit of an ABS in the motor space of a street vehicle by means of a console which can be fixed on the vehicle body;

FIG. 2 is a top view of the console of the apparatus according to FIG. 1;

FIG. 3a is a perspective broken-off view of the apparatus according to FIGS. 1 and 2, approximately in the direction of the arrow III of FIG. 2; and FIG. 3b is a detail of the fastening of the front support of the console according to FIG. 3a, as a sectional view along Line III—III of FIG. 3a.

The apparatus, which is illustrated in FIG. 1 and, as a whole, has the reference number 10, for the fixing of a hydraulic unit, having reference number 11, of an antilock system (ABS) and/or of a wheel slip control system (ASR), is intended for being installed in the motor space of a street vehicle which in FIG. 1 is represented only by an upper area of the wheel house 12 of its vehicle body which receives the left front wheel of the vehicle, to the bottom side of which the apparatus 10 is mounted by means of which the hydraulic unit 11 is fixed. The hydraulic unit 11 which is shown for the purpose of an explanation corresponds—according to the form—to that of a series-produced ABS operating according to the return principle in which case, in an essentially cuboid-shaped housing block 13, solenoid valves which are not shown individually are housed as brake pressure control valves a well as return pumps which are individually assigned to the brake circuits and the common driving motor 14 of which is arranged with a horizontal course of its central longitudinal axis 6 which extends in parallel to the longitudinal direction of the vehicle.

A console which, as a whole, has the reference number 17, is provided as the support for this hydraulic unit and is fastened to the body 12 of the vehicle.

In the illustrated special embodiment, a rivet 18 is provided for the fixing of the console 17 on the vehicle body 12 by means of which the console 17 is fixed by means of a base plate 19 resting closely against the wheel house 12. In order to exclude a rotatability of the console 17 around the—vertically extending —central rivet axis 21, the base plate, as indicated by an interrupted line, has a flat groove-shaped or boat-shaped profiling 22 which engages form-fittingly in a complementary profiling of the wheel house 12 and as a result defines the orientation of the hydraulic unit 11 in its intended installation position.

The hydraulic unit 11, in the manner of a three-point bearing, is vibration-insulatingly disposed in rubber buffers 23, 24 and 25 which, as best indicated in FIG. 2, are arranged, as it were, in the "corners" of an equalsided triangle which is designed symmetrically with respect to the longitudinal center plane 26 of the console in which, viewed in the installation condition of the hydraulic unit 11, the central longitudinal axis 16 extends of the driving motor 14 of the return pumps of the hydraulic unit 11.

As the respective bearing elements, journals 27, which are parallel to the axis and are fixedly connected with the housing block of the hydraulic unit 11 are provided which project into centrally continuous "bore-shaped" receiving openings of thick-walled sleeve-shaped buffer bodies 28 which are inserted into cylindrical cup-shaped receiving sleeves 29 which are mounted on vertical supports 30 and 31 of the console 17. While, in the illustrated installation position according to FIG. 1, they are under (compression) prestress, the buffer bodies 28, in the axial direction, are each supported on the bottom of the cup-shaped receiving sleeve 29 and on a housing surface 33 and 34 of the housing block 13 which is in parallel to it and closely rest against the shell surface of the respective journal and against the inner shell surface of the shell 37 of the cup-shaped receiving sleeve 29 which surrounds it coaxially. The vibration-insulating bearing of the hydraulic unit 11 is achieved by means of the gaps which remain between the free shell edges 38 of the cup-shaped receiving sleeves and the supporting surfaces 33 and 34 of the housing block 13 disposed opposite these receiving sleeves, as well as between the free ends 39 of the journals 28 and the bottom 32 of the receiving sleeves 29, the width of these gaps being slightly larger than the largest amplitudes of axial (longitudinal) vibrations and vertical (transverse) vibrations of the hydraulic unit 11 relative to the console 17 occurring during the driving operation.

Viewed in the longitudinal direction of the vehicle, the console 17 has a forward rubber buffer 23, the central longitudinal axis 41 of which extends in the center plane 26 of the console 17 and of the hydraulic unit 11, and the two rearward rubber buffers 24 and 25, the central longitudinal axes 42 and 43 of which extend at a lateral distance from the longitudinal center plane 26 and in parallel to it.

The essentially cuboid-shaped housing block 13 which comprises the brake pressure control valves and the return pump is arranged within the area of the base plate 19 of the console 17 "between" its rubber buffers 23, 24 and 25, while the driving motor 14 of the return pumps projects in the axial direction beyond the rearward edge of the console 17 formed by the rearward vertical support 30 which in this case has a U-shaped recess 44 between two supporting legs 30′ and 30″ projecting upward from the base plate 19, the two rubber buffers 24 and 25 being fastened to the supporting legs. The overall apparatus is designed such that the central axes 41, 42 and 43 of the rubber buffers 23, 24, and 25 extend at the level of the mass center of the hydraulic unit 11, and that this apparatus is disposed above the geometric center of gravity S of the triangle marked by the buffer arrangement 23, 24, 25.

The support 31 carrying the forward rubber buffer 23, as best shown in FIG. 3, is constructed as an elbow which comprises a vertical supporting leg 31′ on which the receiving sleeve 29 of the forward rubber buffer 23 is arranged, as well as a horizontal base leg 31″ by means of which the support 31 can be fixed to a forward horizontal edge tab 19′ of the base plate 19 of the console 17.

For the fixing of this support 31 to the edge tabs 19′ of the base plate 19 of the console 17, in the shown special embodiment, a threaded journal 46 which projects vertically upward from the edge tab 19′ of the base plate 19 of the console 17 is provided which passes through a bore of the base leg 31″ of the support 31. A threaded nut 47 can be screwed onto this threaded journal and supports itself on the base leg 31″ by way of a spring washer 48 and is tightened by means of a defined moment. As a result, starting from a specified torque acting upon the support 31, a rotatability is achieved of the support 31 around the axis 49 of the threaded journal 46. For the form-fitting marking of the desired position of the support 31, as best shown in the sectional representation of FIG. 3b, its base leg 31″ is provided with a short elastically resilient downward-bent stop tab 51 which projects into a recess 52 of the edge tab 19′ of the base plate 19 of the console and by resting against the forward edge 52′ of this recess 52, marks the desired position of the support 31 at the console 17 shown in FIGS. 2 and 3a.

The purpose of the described construction of the support 31 of the console 17 is its effect explained in the following, for example, in the case of a collision accident in which a high vehicle deceleration occurs, and the front end of the vehicle in which the hydraulic unit 11 is arranged may experience a considerable deformation.

In such a situation in which, because of the mass inertia of the hydraulic unit 11 in contrast to the normal driving operation, a drastically increased force acting in the direction of the arrow 50 of FIG. 2 and 3a is exercised on the support 31, this support 31 yields while elastically bending-open the stop tab 51 and/or its base leg 31" and can now, by means of the rotation around the axis 49 of the threaded journal 46, be swivelled to such an extent that the forward journal 27 of the housing block 13 disengages from the rubber buffer 23 arranged on the—rotatable—support 31, and the hydraulic unit 11 can detach itself as a whole from its anchoring on the console 17.

As a result, the hydraulic unit 11 can more easily "yield" and itself carry out compensating motions in the case of deformations occurring during an accident of tube-shaped brake lines which are laid between the supply connections 53, 54 and 55 and the brake booster of the brake system and between the valve outputs 55 and 57 and the wheels brakes of the vehicle. As a result, a tearing-off of such tube-shaped brake lines from the hydraulic unit 11 can be prevented and a leaking of brake fluid into the motor space of the vehicle is avoided.

By means of this type of targeted elimination of a rigid connection between the hydraulic unit 11 and the body 12 of the vehicle, the danger is also reduced that the hydraulic unit 11, when it is pushed against other safety-relevant aggregates, itself may be damaged to such an extent that brake fluid may leak out or these aggregates may be damaged such that a significant risk of fire may occur as a result.

The elimination of the rigid connection of the hydraulic unit 11 with the body 12 which so far has been explained with respect to its purpose, may—as an alternative or in addition to the pivotable design of the support 31—also be achieved by the fact that the rivet 18 provided for the fixing of the console 17 on the body 12 is designed with an only limited strength or holding capacity so that in the case of an excessive longitudinal deceleration of the vehicle, it acts, as it were, as a "desired breaking point" in which case the hydraulic unit 11 and the console 17, in the case of an accident, detach "jointly" from the vehicle body.

It is also understood that the desired detaching of the hydraulic unit 11 from its anchoring on the console 17 may also be achieved by a sufficiently flexible design of the support 31 alone.

We claim:

1. An apparatus for fixing a hydraulic unit of at least one of an antilock system (ABS) and a wheel slip control system (ASR) in a motor space of a street vehicle on the vehicle body of said street vehicle, said hydraulic unit, viewed in a longitudinal direction of the vehicle, being held between at least one forward and two rearward upwardly projecting legs of a console which is fixed on the vehicle body, characterized in that at least one holding element provided on the console and causing said fixing of the hydraulic unit against axial displacements has a defined low holding force which, starting from a specified minimum deceleration of the vehicle, is no longer sufficient for holding the hydraulic unit fixed at the vehicle body, said minimum deceleration being clearly higher than vehicle decelerations occurring during a driving operation, but lower than longitudinal decelerations of the vehicle occurring in the case of an accident-caused impact of the vehicle on an obstacle which may lead to a deformation of the vehicle in an area of the apparatus itself.

2. An apparatus according to claim 1, a rubber buffer causing a forward-side axial supporting of the hydraulic unit on the console being arranged on a leg of a support of the console which projects vertically upward from a base plate of the console, characterized in that the leg has a bending resistance that is coordinated such that, starting from the specified minimum deceleration of the vehicle, said leg experiences a deformation which permits movement of the hydraulic unit out of an anchoring position on the console.

3. An apparatus according to claim 2, characterized in that the console includes rivet or screw fastening means for connecting the console to the vehicle body which connecting means forms a desired breaking point of said means which is destroyed starting from the specified minimum deceleration of the vehicle.

4. An apparatus according to claim 1, a rubber buffer causing a forward-side axial supporting of the hydraulic unit on the console being arranged on a leg of a support of the console which projects vertically upward from a base plate of the console, characterized in that the support is disposed on the base plate so that said support is rotatable around a vertical axis which is arranged at a lateral distance from a longitudinal center plane of the console containing longitudinal axis of the forward rubber buffer, and in that an elastically yielding detent element is provided which, when resting against front transverse edge of a recess of the base plate, marks a desired position of the support.

5. An apparatus according to claim 4, characterized in that the console includes rivet or screw fastening means for connecting the console to the vehicle body which connecting means forms a desired breaking point of said fastening means which is destroyed starting from the specified minimum deceleration of the vehicle.

6. An apparatus according to claim 1, characterized in that the console includes rivet or screw fastening means for connecting the console to the vehicle body which connecting means forms a desired breaking point of said fastening means.

* * * * *